(12) United States Patent
Wesley

(10) Patent No.: US 6,758,895 B2
(45) Date of Patent: *Jul. 6, 2004

(54) PARTICULATE MINERAL MATERIALS

(75) Inventor: Robin Wesley, Cornwall (GB)

(73) Assignee: Imerys Minerals Limited, Cornwall (GB)

( * ) Notice: Subject to any disclaimer, the term of this patent is extended or adjusted under 35 U.S.C. 154(b) by 0 days.

This patent is subject to a terminal disclaimer.

(21) Appl. No.: 09/930,994

(22) Filed: Aug. 17, 2001

(65) Prior Publication Data

US 2002/0117085 A1 Aug. 29, 2002

(30) Foreign Application Priority Data

Aug. 17, 2000 (GB) .............................. 0020182

(51) Int. Cl.$^7$ .............................................. C04B 14/04
(52) U.S. Cl. ...................... 106/486; 106/416; 106/428
(58) Field of Search ................................ 106/416, 428, 106/486

(56) References Cited

U.S. PATENT DOCUMENTS

| | | |
|---|---|---|
| 2,158,987 A | 5/1939 | Maloney |
| 3,034,859 A | 5/1962 | Gunn et al. |
| 3,171,718 A | 3/1965 | Gunn et al. |
| 3,526,768 A | 9/1970 | Rai et al. |
| 3,615,806 A | 10/1971 | Torock et al. |
| 3,635,662 A | 1/1972 | Lyons |
| 3,798,044 A | 3/1974 | Whitley et al. |
| 4,125,411 A | 11/1978 | Lyons |
| 4,227,920 A | 10/1980 | Chapman et al. |
| 4,234,469 A | 11/1980 | Ohta et al. |
| 4,241,142 A | 12/1980 | Kaliski et al. |
| 4,381,948 A | 5/1983 | McConnell et al. |
| 4,427,450 A | 1/1984 | Kostansek |
| 4,888,315 A | 12/1989 | Bowman et al. |
| 4,889,886 A | 12/1989 | Wada et al. |
| 4,943,324 A | 7/1990 | Bundy et al. |
| 5,085,707 A | 2/1992 | Bundy et al. |
| 5,112,782 A | 5/1992 | Brown et al. |
| 5,128,606 A | 7/1992 | Gate et al. |
| 5,167,707 A | 12/1992 | Freeman et al. |
| 5,168,083 A | 12/1992 | Matthews et al. |
| 5,169,443 A | 12/1992 | Willis et al. |
| 5,332,493 A | 7/1994 | Ginn et al. |
| 5,411,587 A | 5/1995 | Willis et al. |
| 5,439,558 A | 8/1995 | Bergmann et al. |
| 5,454,865 A | 10/1995 | Ginn et al. |
| 5,522,924 A | 6/1996 | Smith et al. |
| 5,573,946 A | 11/1996 | Haxell et al. |
| 5,624,488 A | 4/1997 | Forbus et al. |
| 5,645,635 A | 7/1997 | Behl et al. |
| 5,685,900 A | 11/1997 | Yuan et al. |
| 5,707,912 A | 1/1998 | Lowe et al. |
| 5,735,946 A | 4/1998 | Bloodworth et al. |
| 5,749,958 A | 5/1998 | Behl et al. |
| 5,810,998 A | 9/1998 | Arrington-Webb et al. |
| 5,879,512 A | 3/1999 | McGenity et al. |
| 5,925,454 A | 7/1999 | Bekele |
| 5,948,156 A | 9/1999 | Coutelle et al. |
| 6,149,723 A | 11/2000 | Pruett et al. |
| 6,186,335 B1 | 2/2001 | Arrington-Webb et al. |
| 6,262,161 B1 | 7/2001 | Betso et al. |
| 6,402,826 B1 | 6/2002 | Yuan et al. |
| 6,537,363 B1 * | 3/2003 | Golley et al. ............... 106/486 |

FOREIGN PATENT DOCUMENTS

| | | |
|---|---|---|
| DE | 2 241 577 | 3/1973 |
| DE | 24 49 656 | 12/1975 |
| DE | 26 58 814 | 2/1978 |
| DE | 28 18 954 | 11/1978 |
| DE | 27 39 620 | 3/1979 |

(List continued on next page.)

OTHER PUBLICATIONS

Burgess, Malcolm, "Kaolin, a Glaciers Gift to Georgia," 1985.
Clay Minerals Society Homepage, http://cms/lanl.gov/instruct.html, "Instructions for Authors, Clays and Clay Minerals," *Instructions for Authors*, p. 4 of 5.
Jepson, W. P., "Kaolins, their properties and uses," *Phil. Trans. R. Soc. Lond.*, A311, 411–432, 1984.
Swan, A., "Realistic paper tests for various printing processes," *Printing Technology*, 13(1), 9–22, Apr., 1969.
Abstract, Japanese Patent No. 08012886A, publication date Jan. 1996.
Abstract, German Patent No. 3679147.
Abstract, German Patent No. 3689760.
Abstract, German Patent No. 3565272.
Abstract, German Patent No. 3466547.
Co–pending Application No. 09/608,164, Filed: Jun. 3, 2000.
Co–pending Application No. 09/647,720, Filed: Oct. 4, 2000.
Co–pending Application No. 09/937,671, Filed: Dec. 20, 2001.
Co–pending Application No. 09/937,729, Filed: Dec. 20, 2001.
Co–pending Application No. 10/077,936, Filed: Jul. 18, 2002.

(List continued on next page.)

*Primary Examiner*—C. Melissa Koslow
*Assistant Examiner*—Shalie Manlove
(74) *Attorney, Agent, or Firm*—Finnegan, Henderson, Farabow, Garrett & Dunner, LLP

(57) ABSTRACT

A particulate hydrous mineral suitable for use as an opacifying pigment, filler or extender has a shape factor which is greater than S, where S is defined by Equation 1 as follows:

Figure 1:
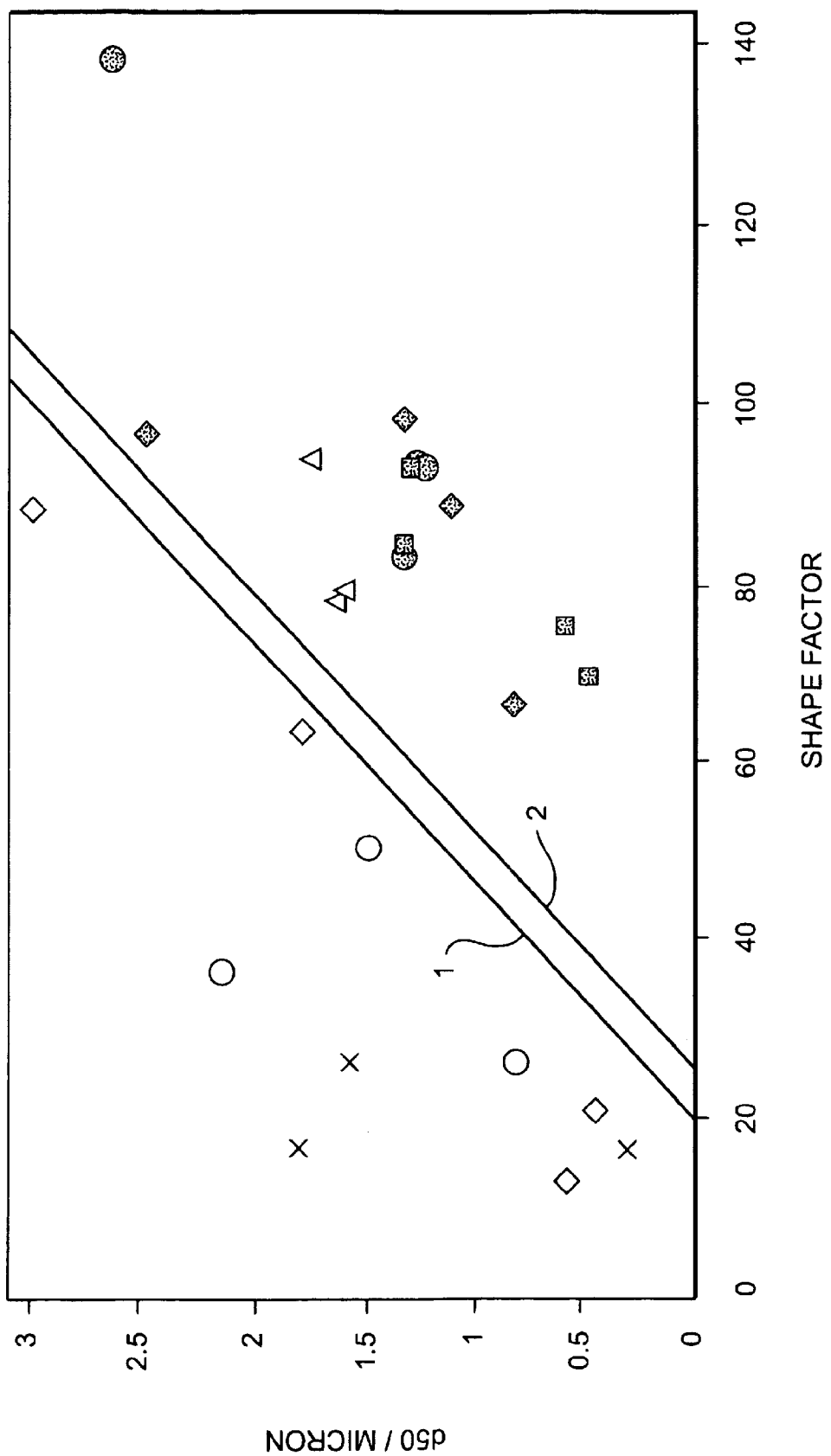

$$S = (d_{50}/0.036) + 20 \qquad \text{Equation 1;}$$

where $d_{50}$ is the mean particle size of the particles of the mineral measured in microns. The particulate mineral is preferably a kaolin, which is particularly suitable for use in aqueous matt paint compositions.

30 Claims, 1 Drawing Sheet

FOREIGN PATENT DOCUMENTS

| | | |
|---|---|---|
| DE | 30 12 235 | 10/1980 |
| DE | 30 47 269 | 7/1982 |
| DE | 36 32 606 | 4/1987 |
| DE | 35 36 371 | 5/1987 |
| DE | 35 40 524 | 5/1987 |
| DE | 37 50 864 | 4/1988 |
| DE | 38 84 605 | 8/1988 |
| DE | 43 01 730 | 7/1993 |
| DE | 42 13 746 | 10/1993 |
| DE | 100 10 941 | 9/2001 |
| EP | 0 001 066 | 4/1980 |
| EP | 0 026 075 | 4/1981 |
| EP | 0 132 094 | 1/1985 |
| EP | 0 239 986 | 10/1987 |
| EP | 0 245 553 | 11/1987 |
| EP | 0 274 888 | 7/1988 |
| EP | 0 341 981 | 11/1989 |
| EP | 0 456 363 | 11/1991 |
| EP | 0 475 434 | 3/1992 |
| EP | 0 524 635 | 1/1993 |
| EP | 0 528 078 | 2/1993 |
| EP | 0 586 904 | 3/1994 |
| EP | 0 588 239 | 3/1994 |
| EP | 0 691 375 | 1/1996 |
| EP | 0 262 649 | 4/1998 |
| EP | 1 088 852 | 4/2001 |
| FR | 2 150 953 | 4/1973 |
| FR | 2 273 040 | 12/1975 |
| FR | 2 359 874 | 2/1978 |
| FR | 2 389 645 | 12/1978 |
| FR | 2 452 511 | 10/1980 |
| FR | 2 558 168 | 7/1985 |
| FR | 2 774 689 | 8/1999 |
| GB | 1032536 | 6/1966 |
| GB | 1375057 | 11/1974 |
| GB | 1469028 | 3/1977 |
| GB | 1493393 | 11/1977 |
| GB | 1513657 | 6/1978 |
| GB | 1597213 | 9/1981 |
| GB | 2223758 | 4/1990 |
| GB | 2240398 | 7/1991 |
| GB | 1032536 | 6/1996 |
| JP | 51005383 | 1/1976 |
| JP | 53016063 | 2/1978 |
| JP | 54010394 | 1/1979 |
| JP | 54047751 | 4/1979 |
| JP | 55131024 | 10/1980 |
| JP | 60023448 | 2/1985 |
| JP | 60038455 | 2/1985 |
| JP | 60084364 | 5/1985 |
| JP | 60161443 | 8/1985 |
| JP | 60235858 | 11/1985 |
| JP | 62116667 | 5/1987 |
| JP | 62232452 | 10/1987 |
| JP | 63132964 | 6/1988 |
| JP | 63175047 | 7/1988 |
| JP | 02-018362 | 1/1990 |
| JP | 02034653 | 2/1990 |
| JP | 02045551 | 2/1990 |
| JP | 04122752 | 4/1992 |
| JP | 0526974 | 10/1993 |
| JP | 06016918 | 1/1994 |
| JP | 06065490 | 3/1994 |
| JP | 06145442 | 5/1994 |
| JP | 08022945 | 1/1996 |
| JP | 10114854 | 5/1998 |
| JP | 2000345032 | 12/2000 |
| JP | 2001098149 | 4/2001 |
| WO | WO 80/01167 | 6/1980 |
| WO | WO 80/02430 | 11/1980 |
| WO | WO 88/05804 | 8/1988 |
| WO | WO 90/11605 | 10/1990 |
| WO | WO 93/04119 | 3/1993 |
| WO | WO 94/07956 | 4/1994 |
| WO | WO 97/32934 | 9/1997 |
| WO | WO 9837152 | 8/1998 |
| WO | WO 98/58613 | 12/1998 |
| WO | WO 99/51815 | * 10/1999 | |
| WO | WO 99/58613 | * 11/1999 | ............. C09C/1/00 |
| WO | WO 00/05311 | 2/2000 |
| WO | WO 00/59840 | 10/2000 |
| WO | WO 00/59841 | * 10/2000 | ........... C04B/14/04 |
| WO | WO 01/46307 | 6/2001 |
| WO | WO 02/16509 | 2/2002 |

OTHER PUBLICATIONS

Co-pending Application No. 10/277,285, Filed: Aug. 26, 2002.

Co-pending Application No. 10/233,599, Filed: Sep. 4, 2002.

Brochure: "Kaopaques Delaminated Aluminum Silicates for Paint Systems", Georgia Kaolin Co., 433 N. Broad Street, Elizabeth, NJ 07207, Oct. 1975.

PCT Search Report, PCT/GB 01/03708, filed Aug. 17, 2001.

* cited by examiner

PARTICULATE MINERAL MATERIALS

The present invention relates to particulate mineral materials having improved properties and their use in application compositions.

Particulate mineral materials find use in a variety of applications including pigments, fillers and extenders for use in paints, plastics, polymers, paper making and paper coating.

Particulate minerals may exist in a hydrous form; Such minerals may include, for example, kaolin clay, ball clay, talc, mica, and vermiculite. Kaolin is a well-known mineral which comprises mainly the mineral kaolinite obtained by processing material obtained from natural sources. Alternatively, kaolins may be produced in a calcined or chemically aggregated form. Calcined kaolins are obtained by processing hydrous kaolins at high temperatures, e.g. greater than 800° C. Chemically aggregated kaolins are composites having a micro structure resembling that of calcined kaolins produced by treating hydrous kaolins with chemicals. Calcined and chemically aggregated kaolins can show benefits such as improved opacity in application compositions compared with hydrous kaolins. However, such benefits are obtained only with certain disadvantages such as additional cost of production of these materials and a deleterious effect on other properties of the host composition.

The present invention is concerned with improving one or more properties of hydrous minerals. In particular, it is concerned with improving the opacity, without significantly hindering the overall combination of properties shown by such materials in host compositions.

According to the present invention in a first aspect there is provided a particulate hydrous mineral suitable for use as an opacifying pigment, filler or extender which has a shape factor which is greater than S, where S is given by Equation 1 as follows:

$$S = (d_{50}/0.036) + 20 \quad \text{Equation 1};$$

where $d_{50}$ is the mean particle size of the particles of the mineral measured in microns (micrometers).

The shape factor and the $d_{50}$ value are measured by known procedures as described later.

We have found surprisingly and beneficially that the particulate mineral according to the invention shows an unusually high opacity compared with prior art particulate hydrous minerals and this can be obtained with acceptable or no changes in other beneficial properties in a host composition.

The particulate hydrous mineral material of the invention may be selected from the group consisting of kaolin, ball clay, talc, mica, and vermiculite. It is especially preferred that the particulate hydrous mineral is a kaolin.

The invention allows particulate hydrous mineral, and particularly hydrous kaolin, to be employed as an extender in a matt paint composition to provide an opacity which matches or approaches that which may be achieved using more expensive extenders such as calcined and chemically aggregated kaolins. Furthermore, this opacity improvement may be obtained without other disadvantages caused by use of calcined and chemically aggregated koalins.

The sheen, mud crack resistance and stain resistance of the composition are adversely affected by addition of calcined and chemically aggregated kaolins but the adverse effect on such properties can be much less using the particulate hydrous mineral, and most particularly hydrous kaolin, according to the invention. This surprising result was not predictable.

The combination of benefits shown by the particulate hydrous mineral, and most preferably the hydrous kaolin, according to the invention is not obtained with prior art hydrous minerals (and kaolins). We believe that the unusually high opacity shown by the hydrous kaolin of the invention is produced by an unusually high porosity. The mineral (particularly kaolin) porosity can be measured in a well known manner by oil absorption as described later. Without wishing to be bound by any particular theory, we believe that the high porosity results from the unusually thin kaolinite platelets which constitute the particles of the new product having properties defined by Equation 1 earlier. A collection of such platelets can exist in a form in which at least some of such platelets do not lie flat in stacks but can be arranged with their axes in a variety of different planes causing significant voids to exist between the platelets to contribute to the porosity.

The particulate mineral of the invention preferably has a fine particle size, a high shape factor, and a steep particle size distribution which are believed to enhance the opacity of the mineral in an application composition.

"Shape factor" as used herein is a measure of an average value (on a weight average basis) of the ratio of mean particle diameter to particle thickness for a population of particles of varying size and shape as measured using the electrical conductivity method and apparatus described in GB-A-2240398/U.S. Pat. No. 5,128,606/EP-A-0528078 and using the equations derived in these patent specifications. "Mean particle diameter" is defined as the diameter of a circle which has the same area as the largest face of the particle. In the measurement method described in EP-A-0528078 the electrical conductivity of a fully dispersed aqueous suspension of the particles under test is caused to flow through an elongated tube. Measurements of the electrical conductivity are taken between (a) a pair of electrodes separated from one another along the longitudinal axis of the tube, and (b) a pair of electrodes separated from one another across the transverse width of the tube, and using the difference between the two conductivity measurements the shape factor of the particulate material under test is determined.

The mean particle size or $d_{50}$ value and other particle size properties referred to herein for the particulate mineral according to the invention are as measured in a well known manner by sedimentation of the particulate material in a fully dispersed condition in an aqueous medium using a SEDIGRAPH 5100 machine as supplied by Micromeritics Corporation. Such a machine provides measurements and a plot of the cumulative percentage by weight of particles having a size, referred to in the art as the 'equivalent spherical diameter' (esd), less than given esd values. The mean particle size $d_{50}$ is the value determined in this way of the particle esd at which there are 50% by weight of the particles which have an equivalent spherical diameter less than that $d_{50}$ value.

The value of $d_{50}$ for the preferred particulate kaolin according to the invention may for example be in the range 0.4 μm to 3 μm, especially 0.5 μm to 2.0 μm. For example, particulate kaolin of English (Cornish) origin may have a $d_{50}$ value of from 0.5 μm to 1.0 μm. Particulate kaolins having some other origins may have a larger $d_{50}$ value.

It is not necessary for the preferred particulate kaolin of the invention to have a shape factor which is high, e.g. above 40. However, if the shape factor is less than 40 the $d_{50}$ value must be less than about 0.6 μm to satisfy the above relationship expressed in Equation 1. If the d50 value is greater than 1 μm then the shape factor must be greater than about 50 to satisfy the above relationship of Equation 1. Similarly, if the d50 value is greater than 2 μm then the shape factor must be greater than about 75. Preferably, the particulate kaolin has a shape factor of at least 40, in many cases at least 60, e.g. a shape factor in the range 70 to 140, especially from 80 to 120. In all cases, however, the shape factor is greater than S where S is defined by the relationship with $d_{50}$ value given in Equation 1 above.

Preferably, the oil absorption of the preferred particulate kaolin is at least 50 grammes of linseed oil per 100 grammes of kaolin. (This may be measured in the manner described in Method A).

It is preferred that the particulate mineral, which is preferably a hydrous kaolin, according to the present invention has a shape factor which is greater than S where S is defined by Equation 2 as follows:

$$S=(d_{50}/0.036)+25 \qquad \text{Equation 2.}$$

The hydrous mineral according to the invention may be prepared by light comminution, e.g. grinding or milling, of a coarse mineral to give suitable delamination thereof. The comminution may be carried out by use of beads or granules of a plastics, eg. nylon, grinding or milling aid. The coarse mineral may be refined to remove impurities and improve physical properties using well known procedures. The mineral may be treated by a known particle size classification procedure, e.g. screening and/or centrifuging, to obtain particles having a desired particle size distribution and $d_{50}$ value.

The steepness of the particle size distribution ('psd') of the particulate mineral according to the invention is also important. The steepness (sometimes referred to as 'narrowness') of the psd refers to the slope of the psd curve. Thus, in some cases the psd of the mineral according to the invention may be steep and in other cases it may not steep or 'broad'. The steepness can be defined in several ways. In this specification, the steepness is measured in a manner which is typical of these various ways and is expressed as 100× the ratio of $d_{30}$ to $d_{70}$, where $d_{30}$ is the value of the particle esd less than which there are 30% of the particles and $d_{70}$ is the value of the particle esd less than which there are 70% of the particles as obtained from the psd measured as above.

The particulate mineral according to the invention, which is preferably a kaolin, may be used in the various applications in which the mineral is used as a pigment, filler or extender especially in paints, plastics, polymers and paper making and coating.

The particulate mineral according to the first aspect of the invention may be mixed with other pigments, fillers and extenders to obtain a blend of properties provided by the constituents of the mixture. The other pigment, filler or extender material may comprise one or more of hydrous kaolin, calcined kaolin, aggregated kaolin, calcium carbonate (ground or precipitated), talc, gypsum or other known white particulate mineral or pigment material. For example, it is illustrated later that the opacity of matt paint compositions containing kaolin is raised at the expense of stain resistance. However, an extender giving improved opacity but with acceptable loss of stain resistance may be obtained by use of the preferred particulate kaolin according to the invention blended with other pigment, filler or extender materials. Thus, an improvement in opacity may still be obtained by blending the particulate kaolin according to the invention with a commercially available particulate material, e.g. a hydrous kaolin which does not satisfy Equation 1 earlier, and by using the blend as an extender in a matt paint composition.

According to the present invention in a second aspect there is provided a paint composition which includes as an extender material a particulate mineral according to the first aspect optionally mixed with other particulate or white pigment material.

It is preferred that the paint composition is a matt paint composition. It is also preferred that the particulate mineral of the first aspect of the invention is a kaolin.

The composition may contain, in addition to the said extender material, ingredients which are usually employed in a matt paint composition. Thus, the composition may contain a latex binder and a primary pigment, namely $TiO_2$. Other conventional additives such as one or more of dispersant(s), wetting agent, pH modifier, thickener(s), antifoamer or defoamer and antifreeze coalescent may be incorporated in the composition. An example of a typical matt paint composition is given later.

Embodiments of the present invention will now be described by way of example with reference to the later Examples and with reference to the accompanying drawing, in which:

FIG. 1 is a graph of $d_{50}$ value plotted against shape factor for particulate kaolins.

We have measured (in the manner described later) the opacity in a given paint composition of numerous particulate kaolins (including some commercially available products and some new materials) and we have found that the relationship between the $d_{50}$ value and the shape factor of the kaolin to give suitably improved opacity can be expressed such that the shape factor is greater than S where S is as defined in Equation 1 earlier. Preferably, the shape factor is greater than S where S is as defined in Equation 2 earlier. Equations 1 and 2 are plotted graphically as lines indicated by reference numerals 1 and 2 in FIG. 1. Kaolins according to the invention, which give suitably improved opacity, have a shape factor when plotted against $d_{50}$ value which fall in the region to the right of line 1, preferably to the right of line 2. Prior art products which do not show suitably improved opacity when plotted in this way have a shape factor which falls to the left of line 1.

In the following Examples, the following methods were employed to test extenders and to make and test matt paint compositions using the kaolin extenders investigated in each Example.

Method A: Measurement of Oil Absorption of Extenders

Oil absorption of kaolins is measured using linseed oil according to the method specified in British Standard BS EN-ISO 787-5:1995—General methods of test for pigments and extenders—Determination of absorption value.

Method B: Preparation of Paint Compositions

A paint composition for testing kaolin extenders is made according to the following procedure.

Makedowns are calculated to give a final mass of 400 g of paint and are made down in a 600 cm³ plastics beaker. All ingredients are weighed to an accuracy of within 0.05 g.

A stock containing defoamer, biocide, wetting agents, dispersant, thickener and water is prepared. The mineral parts of the paint formulation are slowly added to the stock, whilst mixing with a high speed disperser. The mixture of liquid stock and minerals is referred to as the 'mill base'. When all the minerals have been added, the inner wall of the beaker is scraped, and the speed of stirring is increased. The stirrer speed is greater than 3000 rpm, sufficient to give a "rolling doughnut" vortex. The millbase is stirred at this speed for 15 minutes, in order to ensure good dispersion of the minerals. The remainder of the paint ingredients, i.e. thickener, co-solvent, water, latex binder and acrylic thickener are added sequentially.

The paint composition is placed in a temperature-controlled environment at 23° C. (within an error margin of 2° C.) overnight prior to draw downs for tests in the relevant substrates being made.

The paint formulation was made according to Table 1 as follows:

TABLE 1

| Ingredient | Weight % |
|---|---|
| TiO$_2$ | 9.0 |
| Extender (Kaolin under test) | 10.0 |
| Calcium carbonate | 30.0 |
| Sodium polyacrylate | 0.35 |
| 10% sodium hexametaphophate | 0.5 |
| Ammonia solution 0.880 M | 0.15 |
| Hydroxyethylcellulose thickener 2% | 15.0 |
| Hydrocarbons defoaming agent | 0.3 |
| Biocide | 0.1 |
| Propylene Glycol | 2.0 |
| Coalescing solvent | 1.4 |
| Latex | 13.0 |
| Acrylic polymer/water thickener | 0.8 |
| Water | 17.4 |
| Total = | 100.00 |
| % Pigment Volume Concentration | 74.09 |
| Specific gravity g/cm$^3$ | 1.479 |
| Solids weight % | 56.25 |
| Solids volume % | 34.35 |

Method C: Measurement of Paint Composition Opacity

Opacity or hiding power is the ability of a paint film of given thickness to hide an underlying substrate surface. In this method a standard film of the paint under test is formed at a spreading rate of 20 meters squared per liter on a standard substrate having a glossy surface, half of the surface area being black and the other half being white. After drying of the film under standard controlled conditions, reflectance measurements are made using a Minolta Spectrophotometer CM-3610d separately from the parts of the film covering the black and white halves of the substrate. The Minolta instrument is set up at an angle of 10° to the normal using as primary illuminant D-65 Daylight 6500° K.

The opacity is measured as $(R_b/R_w) \times 100$, where $R_b$ is the mean reflectance from the black half of the surface and $R_w$ is the mean reflectance from the white half of the surface. The result is expressed as a percentage value.

Method D: Measurement of Paint Composition Stain Resistance

The sample paint is applied to two glass plates using a block spreader and a standard applicator and the films produced are allowed to dry under controlled conditions, i.e. a temperature of 23° C. and a relative humidity of 50% for 24 hours. One of the plates is not further treated. The other plate is treated by staining as follows. The plate is brushed with a standard bitumen solution and left to stand in a vertical position for one minute. After this time, the paint film is washed with white spirit and left to stand for one minute. The film is washed again with white spirit and laid in a horizontal position. The excess white spirit is removed and the paint film is allowed to dry for at least two hours at ambient temperature. For the paint film on each plate reflectance measurements are made using a Minolta Spectrophotometer CM-3610d and a mean reflectance is calculated. The stain resistance is determined by:

$(R_s/R_u) \times 100$ where $R_s$ is the mean reflectance of the treated stained paint film and $R_u$ is the mean reflectance of the unstained paint film. The result is expressed as a percentage value.

Method E: Measurement of Paint Composition Sheen

The sheen is equivalent to the gloss at (a specular angle of) 85°, and is often referred to by both names.

This is measured by the method described in British Standards BS EN ISO 2813:2000 Paints and varnishes—Measurement of specular gloss of non-metallic paint films at 20°, 60° and 85°.

Method F: Measurement of Paint Composition Mud Crack Resistance

Mud cracking is a defect which occurs during the formation and drying of a paint film. It is caused by internal stresses in the film set up by such processes as solvent evaporation and film contraction.

Films of a paint under test of various film thicknesses are applied to a highly porous plasterboard using standard applicators having different gap sizes. The paint films formed are allowed to dry for 24 hours under controlled conditions, i.e. a temperature of 23° C. and a relative humidity of 50%. The resulting films are carefully inspected for the presence of cracking. The resistance of the paint to cracking is measured as the maximum applicator gap size that can be used to apply the paint without cracking occurring.

Method G: Measurement of Paint Scrub Resistance

This is measured using the method described in British Standard BS 3900-F17:1998 (ISO 11998:1998)—Methods of tests for pain—Durability tests on paint films—wet scrub resistance and cleanability of coatings. A film of the paint is applied using a standard applicator to a standard substrate and a non-abrasive scrub liquid is continually added slowly to the film. The film is scrubbed with a standard non-woven abrasive hand pad. The result is expressed as a weight loss per unit area per 100 scrub cycles caused by the treatment.

The following Examples illustrate kaolins embodying the invention and their use in matt paint compositions.

EXAMPLE 1

A hydrous kaolin embodying the invention, Kaolin 1, was obtained from Cornwall, U.K. It had been refined by standard processing procedures and was lightly ground. Kaolin 1 had a $d_{50}$ value of about 1.32. According to Equation 1 earlier, the shape factor for this product should be greater than (1.32/0.036)+20, i.e. greater than about 57. The shape factor was in fact measured as 94.

The steepness of Kaolin 1 was found to be 36. The BET surface areas was 9.95 m$^2$g$^{-1}$. The oil absorption of Kaolin 1 was found by Method A to be 59.5 grammes of linseed oil per 100 grammes of kaolin.

Kaolin 1 was formed into a matt paint composition using Method B described earlier. The resulting paint composition, Composition 1, beneficially showed an unusually high opacity of 91.1% at a paint film spreading rate of 20 m$^2$1$^{-1}$ measured by Method C described earlier. The oil stain resistance of Composition 1 was found to be about 70% measured by Method D described earlier.

The sheen of Composition 1 was measured by Method E described earlier and was found to be 3.3%. The mud crack resistance was found to be 1250 µm and the scrub resistance weight loss was found to be 5.26 mg.cm$^{-2}$ for 100 cycles.

EXAMPLE 2

A fine hydrous kaolin embodying the invention, Kaolin 2, was obtained from an Indonesian deposit. It was processed by known procedures. Kaolin 2 had a $d_{50}$ value of about 0.61 μm. According to Equation 1 this required the shape factor to be greater than (0.61/0.036)+20, i.e. greater than about 37. The shape factor of Kaolin 2 was in fact measured as 76.

The oil absorption of Kaolin 2 was measured by Method A to be about 58 grammes of linseed oil per 100 grammes of kaolin. The BET surface area of Kaolin 2 was 16.53 $m^2g^{-1}$. The steepness of Kaolin 2 was found to be 30.

Kaolin 2 was formed into a matt paint composition, Composition 2, in the manner of Method B described earlier. Composition 2 was found, using Method C to show an unusually high opacity of about 91.6 at 20 $m^2l^{-1}$. Composition 2 was found, using Method D, to show a stain resistance of about 72.5%. The sheen of Composition 2 was found to be about 3.7% and the scrub resistance weight loss was found to be 5.11 $mg.cm^{-2}$ for 100 cycles. The mud crack resistance was found to be 1250 μm.

EXAMPLE 3

A further hydrous kaolin embodying the invention, Kaolin 3, was obtained from Brazil. Kaolin 3 had been refined and lightly ground. Kaolin 3 had a $d_{50}$ value of about 2.4 μm. According to Equation 1 earlier, the shape factor should be greater than (2.4/0.036)+20, i.e. greater than about 87. The shape factor of Kaolin 3 was in fact measured to be 140.

The oil absorption of Kaolin 3 was found by Method B to be about 73 grammes of linseed oil per 100 grammes of kaolin.

Kaolin 3 was formed into a matt paint composition, Composition 3, in the manner of Method B described earlier. Composition 3 was found, using Method C, to show an unusually high opacity of about 92.5 at 20 $m^2 l^{-1}$. Composition 3 was found using Method D described earlier, to show a stain resistance of about 68% and using Method E a sheen of about 2.9%.

EXAMPLE 4

A further hydrous kaolin embodying the invention, Kaolin 4, was obtained having a d50 value of 0.56 μm. According to Equation 1 this requires the shape factor to be greater than (0.56/0.036)+20, i.e. greater than about 35. The shape factor was in fact measured as 69. The oil absorption of Kaolin 4 was measured by Method A to be about 69 grammes of linseed oil per 100 grammes of kaolin. The BET surface area of Kaolin 4 was found to be 17.97 $m^2g^{-1}$. The Steepness of Kaolin 4 was found to be 31.

Kaolin 4 was formed into a matt paint composition, Composition 4, in the manner of Method B described earlier. Composition 4 was found, using Method C to show an unusually high opacity of about 91.2% at 20 $m^2l^{-1}$. Composition 4 was found, using Method D, to show a stain resistance of about 76.5%. The sheen of Composition 4 was found to be 3.8% and the scrub resistance weight loss was found to be 5.58 $mg.cm^{-2}$ for 100 cycles. The mud crack resistance was found to be 950 μm.

EXAMPLE 5 (COMPARATIVE)

A commercially available hydrous kaolin, Kaolin 5, from Cornwall, UK sold as an opacifying extender in matt paint compositions was obtained. Kaolin 5 was found to have a $d_{50}$ value of about 0.47 μm. For a kaolin to satisfy Equation 1 with this $d_{50}$ value it would have to have a shape factor greater than (0.47/0.036)+20, i.e. greater than about 33. However, Kaolin 5 was found to have a shape factor of about 21. It was also found using Method A to show an oil absorption of about 40 grammes of Kaolin per 100 grammes of kaolin. The BET surface area of Kaolin 5 was found to be 14.6 $m^2g^{-1}$.

Kaolin 5 was formed into a paint composition, Composition 5, in the manner of Method B. Composition 5 was found to have an opacity of 90 at 20 $m^2l^{-1}$ measured using Method C, a stain resistance of about 88% using Method D, and a sheen of about 3.7% measured using Method E. The scrub resistance weight loss of Composition 5 was 3.37 $mg.cm^{-2}$ for 100 cycles and the mud crack resistance of 1150 μm.

The results of Examples 1 to 5 show that the Kaolins 1–4 beneficially had a higher oil absorption, a measurement of porosity which is a property beneficial in paint composition formulation, than commercially available Kaolin 5. Compositions 1 to 4 prepared from Kaolins 1 to 4 respectively and beneficially had a higher opacity than Composition 5 which contains commercially available Kaolin 5. The sheen value is not substantially raised and is beneficially reduced in two of the Examples. Although the stain resistance of Compositions 1 to 4 is reduced (compared with Composition 5) the reductions are expected in view of the increased porosity as demonstrated by the oil absorption but are not as great as might be expected and are acceptable.

EXAMPLES 6, 7, 8, 9 AND 10

Hydrous kaolins embodying the invention, Kaolins 6, 7, 8, 9 and 10 were obtained from Cornwall, England. The kaolins had been refined by standard processing techniques and were lightly ground. The physical properties of Kaolins 6, 7, 8, 9 and 10 are set forth in Table 2, as follows:

TABLE 2

|  | Examples | | | | |
| --- | --- | --- | --- | --- | --- |
|  | 6 Kaolin 6 | 7 Kaolin 7 | 8 Kaolin 8 | 9 Kaolin 9 | 10 Kaolin 10 |
| $d_{50}$ (μm) | 0.48 | 0.64 | 0.81 | 1.25 | 0.59 |
| Shape Factor | 60 | 68 | 74 | 88.6 | 68 |
| Steepness | 30 | 30 | 30 | 33 | 49 |
| BET Surface Area $M^2g^{-1}$ | 17.8 | 15.8 | 13.72 | 10.84 | 13.1 |
| Oil Absorption | 65 | 58 | 56 | 60 | — |

Kaolins 6, 7, 8, 9 and 10 had a respective $d_{50}$ value of about 0.48, 0.64, 0.81, 1.25 and 0.59. According to Equation 1 earlier, the shape factor for these products should be greater than ($d_{50}$/0.036)+20, ie respectively greater than about 33, 38, 42.5, 54.7 and 37. In fact, the shape factors for Kaolins 6 to 10 were measured to be considerably higher, as shown in Table 2.

Kaolins 6 to 10 were separately formed into matt paint compositions 6 to 10 using Method B described earlier. The properties of the paint compositions were determined by Methods C, D, E, F and G as described earlier and are demonstrated in Table 3, as follows:

TABLE 3

| | Paint Composition | | | | |
|---|---|---|---|---|---|
| | 6 | 7 | 8 | 9 | 10 |
| Opacity (%) @ 20 m² L⁻¹ | 91.6 | 91.8 | 91.7 | 91.9 | 92.0 |
| Gloss @ 85° | 36 | 3.5 | 3.3 | 3.4 | 3.9 |
| Stain Resistance (%) | 84.1 | 77.3 | 76.7 | 77.6 | 83.5 |
| Scrub Resistance Mg.cm⁻² per 100 cycles | 7.34 | 7.79 | 7.19 | 7.49 | 8.90 |
| Mud crack resistance, μm | 1300 | 1350 | 1500 | 1200 | 1100 |

EXAMPLES 11 AND 12

Hydrous kaolins embodying the invention, Kaolins 11 and 12 were obtained from a US deposit. The kaolins were refined by standard processing techniques and were lightly ground. The physical properties of Kaolins 11 and 12 are set forth in Table 4, as follows:

TABLE 4

| | Examples | |
|---|---|---|
| | 11 Kaolin 11 | 12 Kaolin 12 |
| $d_{50}$ (μm) | 1.22 | 1.14 |
| Steepness | 30 | 32 |
| Shape Factor | 89 | 58 |

Kaolins 11 and 12 had a respective $d_{50}$ value of about 1.22 and 1.14. According to Equation 1 earlier, the shape factor of these products should be greater than $(d_{50}/0.036)+20$, ie. respectively greater than about 54 and 52. In fact, the shape factors for Kaolins 11 and 12 were measured to be higher, as shown in Table 4.

Kaolins 11 and 12 were separately formed into matt paint compositions 11 and 12 using Method B described earlier. The properties of the paint compositions were determined by Methods C, D, E, F and G as described earlier and are demonstrated in Table 5, as follows:

TABLE 5

| | Paint Composition | |
|---|---|---|
| | 11 | 12 |
| Opacity (%) @ 20 m² L⁻¹ | 91.2 | 90.6 |
| Gloss @ 85° | 2.8 | 3.1 |
| Stain Resistance (%) | 76.4 | 78.7 |
| Mud crack resistance, μm | >1500 | 1300 |

EXAMPLE 13

A hydrous kaolin embodying the invention, Kaolin 13, was obtained from an Australian deposit. It had been refined by standard processing procedures and was lightly ground. Kaolin 13 had a $d_{50}$ value of about 0.45. According to Equation 1 earlier, the shape factor for this product should be greater than $(0.45/0.036)+20$, i.e. greater than about 32.5. The shape factor was in fact measured as 72.5.

The steepness of Kaolin 13 was found to be 30. The oil absorption of Kaolin 13 was found by Method A to be 61 grammes of linseed oil per 100 grammes of kaolin.

Kaolin 13 was formed into a matt paint composition using Method B described earlier. The resulting paint composition, Composition 13, beneficially showed an unusually high opacity of 92.0% at a paint film spreading rate of 20 m²1⁻¹ measured by Method C described earlier. The oil stain resistance of Composition 1 was found to be about 83.0% measured by Method D described earlier.

The sheen of Composition 1 was measured by Method E described earlier and was found to be 4.1%. The mud crack resistance was found to be 1100 μm and the scrub resistance weight loss was found to be 7.66 mg.cm⁻² for 100 cycles.

What is claimed is:

1. A particulate hydrous mineral suitable for use as at least one of an opacifying pigment, filler and extender, which has a shape factor which is greater than S, where S is defined by Equation 1 as follows:

$$S=(d_{50}/0.036)+20 \qquad \text{Equation 1;}$$

where $d_{50}$ is the mean particle size of the particles of the mineral measured in microns, and wherein if the particulate hydrous mineral is kaolin, the shape factor of the particulate kaolin ranges from 70 to 140.

2. A particulate mineral according to claim 1, wherein the shape factor is greater than S, where S is defined by Equation 2 as follows:

$$S=(d_{50}/0.036)+25 \qquad \text{Equation 2.}$$

3. A particulate mineral according to claim 1 or 2, wherein the mineral is chosen from kaolin, ball clay, talc, mica, and vermiculite.

4. A particulate mineral according to clam 3, wherein the mineral is kaolin.

5. A particulate mineral according to claim 4, wherein the mean particle size of the kaolin ranges from 0.4 μm to 3 μm.

6. A particulate mineral according to claim 5, wherein the mean particle size of the kaolin ranges from 0.5 μm to 2.0 μm.

7. A particulate hydrous mineral according to claim 4, wherein the kaolin has a shape factor ranging from 80 to 120.

8. A particulate hydrous kaolin suitable for use as at least one of an opacifying pigment, filler and extender which has a shape factor which is greater than S, where S is defined by Equation 1 as follows:

$$S(d_{50}/0.036)+20 \qquad \text{Equation 1;}$$

where $d_{50}$ is the mean particle size of the particles of the kaolin measured in microns, and wherein the kaolin has a linseed oil absorption of at least 50 grams per 100 grams of kaolin.

9. A pigment composition which comprises a blend of the mineral according to claim 3 together with one or more other white pigment materials.

10. A particulate hydrous kaolin according to claim 8, wherein the shape factor is greater than S, where S is defined by Equation 2 as follows:

$$S=(d_{50}/0.036)+25 \qquad \text{Equation 2;}$$

where $d_{50}$ is the mean particle size of the particles of the kaolin measured in microns.

11. A particulate hydrous kaolin according to claim 8, wherein the mean particle size of the kaolin ranges from 0.4 μm to 3 μm.

12. A particulate hydrous kaolin according to claim 11, wherein the mean particle size of the kaolin ranges from 0.5 μm to 2.0 μm.

13. A particulate hydrous kaolin according to claim 8, wherein the shape factor of the kaolin is at least 40.

14. A particulate hydrous kaolin according to claim 13, wherein the shape factor of the kaolin is at least 60.

15. A particulate hydrous kaolin according to claim 14, wherein the shape factor of the kaolin ranges from 70 to 140.

16. A particulate hydrous kaolin according to claim 15, wherein the kaolin has a shape factor ranging from 80 to 120.

17. A particulate hydrous kaolin according to claim 8, wherein the kaolin has a linseed oil absorption of at least 60 grams per 100 grams of kaolin.

18. A pigment composition which comprises a blend of the particulate hydrous kaolin according to claim 8 together with at least one other white pigment material.

19. A paint composition comprising a binder, and a pigment composition comprising a blend of a particulate hydrous mineral which has a shape factor greater than S, where S is defined by Equation 1 as follows:

$$S=(d_{50}/0.036)+20 \qquad \text{Equation 1;}$$

where $d_{50}$ is the mean particle size of the particles of the mineral measured in microns, and at least one other white pigment material.

20. A paint composition according to claim 19, wherein the shape factor is greater than S, where S is defined by Equation 2 as follows:

$$S=(d_{50}/0.036)+25 \qquad \text{Equation 2;}$$

21. A paint composition according to claim 19, wherein the mineral is chosen from kaolin, ball clay, talc, mica, and vermiculite.

22. A paint composition according to claim 21, wherein the mineral is a kaolin.

23. A paint composition according to claim 22, wherein the mean particle size of the kaolin is from 0.4 μm to 3 μm.

24. A paint composition according to claim 23, wherein the mean particle size of the kaolin is from 0.5 μm to 2.0 μm.

25. A paint composition according to claim 22, wherein the shape factor of the kaolin is at least 40.

26. A paint composition according to claim 25, wherein the shape factor of the kaolin is at least 60.

27. A paint composition according to claim 26, wherein the kaolin has a shape factor ranging from 70 to 140.

28. A paint composition according to claim 27, wherein the kaolin has a shape factor ranging from 80 to 120.

29. A paint composition according to claim 19, wherein the composition is a matt paint composition.

30. A paint composition according to claim 29, wherein the pigment composition further comprises titanium dioxide.

* * * * *

UNITED STATES PATENT AND TRADEMARK OFFICE
CERTIFICATE OF CORRECTION

PATENT NO. : 6,758,895 B2
DATED : July 6, 2004
INVENTOR(S) : Robin Wesley

It is certified that error appears in the above-identified patent and that said Letters Patent is hereby corrected as shown below:

Column 10,
Line 43, "clam" should read -- claim --.
Line 59, "$S(d_{50}/0.036)+20$" should read -- $S = (d_{50}/0.036)+20$ --.

Column 12,
Line 12, "Equation 2;" should read -- Equation 2. --.

Signed and Sealed this

Twenty-fourth Day of August, 2004

JON W. DUDAS
*Director of the United States Patent and Trademark Office*